United States Patent
Baghert et al.

(10) Patent No.: US 10,158,797 B2
(45) Date of Patent: Dec. 18, 2018

(54) COMBINING IMAGES WHEN A FACE IS PRESENT

(71) Applicant: Motorola Mobility LLC, Chicago, IL (US)

(72) Inventors: Saeid Baghert, Chicago, IL (US); Peter Matsimanis, Glenview, IL (US); Cesare Mercurio, Chicago, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/476,729

(22) Filed: Mar. 31, 2017

(65) Prior Publication Data

US 2018/0288311 A1     Oct. 4, 2018

(51) Int. Cl.
| H04N 5/225 | (2006.01) |
| H04N 5/232 | (2006.01) |
| H04N 5/265 | (2006.01) |
| G06T 7/73 | (2017.01) |
| G06T 5/50 | (2006.01) |
| G06K 9/00 | (2006.01) |

(52) U.S. Cl.
CPC ..... *H04N 5/23219* (2013.01); *G06K 9/00228* (2013.01); *G06T 5/50* (2013.01); *G06T 7/73* (2017.01); *H04N 5/23229* (2013.01); *H04N 5/265* (2013.01); *G06T 2207/20221* (2013.01); *G06T 2207/30201* (2013.01)

(58) Field of Classification Search
CPC ........... G06K 9/00221; H04N 5/23219; H04N 5/235; H04N 5/23232; H04N 5/2355; H04N 3/155; H04N 5/23229; H04N 5/2356; H04N 5/353; H04N 5/35536; H04N 5/35572; H04N 5/2352; G03B 29/00

See application file for complete search history.

(56) References Cited

U.S. PATENT DOCUMENTS

| 2004/0119874 A1* | 6/2004 | Imai ................... H04N 1/32128 348/362 |
| 2006/0055784 A1* | 3/2006 | Sugihara ................ H04N 9/735 348/207.99 |

(Continued)

OTHER PUBLICATIONS

Yin-Hu Chen et al., "Backlit Face Detection", U.S. Appl. No. 15/353,435, filed Nov. 16, 2016, 44 pages.

(Continued)

*Primary Examiner* — Chia Wei A Chen

(74) *Attorney, Agent, or Firm* — Kunzler, PC

(57) ABSTRACT

For creating a single image from two images taken at different exposure setting when a face is detected, an apparatus includes an image sensor and a processor. The processor calculates a first exposure value for the photographic subject matter. Here, the first exposure value is calculated using the photographic subject matter as a whole. The processor determines whether a face is present within the photographic subject matter. In response to the determining that a face is present, the processor calculates a second exposure value. Here, the second exposure value is calculated to correctly expose the face. The processor controls the image sensor to capture a first image using the first exposure value and a second image using the second exposure value. The processor creates a third image using the first image and the second image.

18 Claims, 11 Drawing Sheets

(56) References Cited

U.S. PATENT DOCUMENTS

| | | | | |
|---|---|---|---|---|
| 2006/0061598 A1* | 3/2006 | Mino | G06K 9/00228 | 345/629 |
| 2011/0249143 A1* | 10/2011 | Tatsumi | H04N 5/2355 | 348/229.1 |
| 2012/0002082 A1* | 1/2012 | Johnson | G06T 5/50 | 348/234 |
| 2012/0307107 A1* | 12/2012 | Brunner | H04N 5/23219 | 348/229.1 |
| 2014/0028792 A1* | 1/2014 | Abe | H04N 5/23238 | 348/37 |
| 2014/0104483 A1* | 4/2014 | Kunishige | H04N 5/23212 | 348/349 |
| 2014/0125863 A1* | 5/2014 | Toyoda | H04N 5/2355 | 348/362 |
| 2014/0218559 A1* | 8/2014 | Yamaguchi | H04N 5/2352 | 348/229.1 |
| 2015/0036040 A1* | 2/2015 | Konishi | H04N 5/2258 | 348/364 |
| 2015/0077603 A1* | 3/2015 | Matsuzawa | H04N 5/77 | 348/297 |
| 2015/0244916 A1* | 8/2015 | Kang | H04N 5/2353 | 348/222.1 |
| 2015/0312463 A1* | 10/2015 | Gupta | H04N 5/23254 | 348/239 |
| 2016/0019698 A1* | 1/2016 | Kalva | G06K 9/00778 | 382/103 |
| 2016/0217318 A1* | 7/2016 | Hayasaka | G06T 3/60 | |
| 2016/0316132 A1* | 10/2016 | Kinoshita | H04N 5/345 | |
| 2017/0039761 A1* | 2/2017 | Zhang | G06T 7/12 | |
| 2017/0180646 A1* | 6/2017 | Kim | H04N 5/23219 | |
| 2017/0230562 A1* | 8/2017 | Gupta | H04N 5/2355 | |
| 2017/0351908 A1* | 12/2017 | Wang | G06K 9/00255 | |

OTHER PUBLICATIONS

Yin-Hu Chen et al., "Multi-Camera Capture of a High Dynamic Range Image", U.S. Appl. No. 15/354,501, filed Nov. 17, 2016, 26 pages.

Yin-Hu Chen et al., "Improved High Dynamic Range Sensor Resolution Using Multiple Image Sensors", U.S. Appl. No. 15/588,437, filed May 5, 2017, 48 pages.

Kang et al., "High Dynamic Range Video", Interactive Visual Media Group, Microsoft Research, Redmond, WA, Jul. 2003, 7 pages.

Nayar et al, "High Dynamic Range Imaging: Spatially Varying Pixel Exposures", http://www1.cs.columbia.edu/CAVE/publications/pdfs/Nayar_CVPR00_2.pdf, Jun. 15, 2000, 8 pages.

Kao et al., Adaptive Exposure Control and Real-Time Image Fusion for Surveillance Systems, IEEE, National Science Council, 2006, pp. 935-938.

* cited by examiner

Center-weighted image 805

Face-weighted Image 810

Merged image 815

COMBINING IMAGES WHEN A FACE IS PRESENT

FIELD

The subject matter disclosed herein relates to digital cameras and more particularly relates to selectively combining images taken at different exposure setting when a face is detected.

BACKGROUND

Description of the Related Art

Cameras, particularly on mobile devices, are notorious for performing poorly for human portraiture when the face of the subject is in high contrast to the background. When the subject is backlit either the background or the subject will suffer from overexposure or underexposure.

BRIEF SUMMARY

A method for creating a single image from two images taken at different exposure setting when a face is detected is disclosed. The method includes calculating (e.g., by use of a processor) a first exposure value for a photographic subject matter and determining whether a face is present within the photographic subject matter. The method includes calculating a second exposure value in response to determining that a face is present within the photographic subject matter. The second exposure value is calculated to expose the face. The method includes capturing a first image using the first exposure value and capturing a second image using the second exposure value. The method further includes creating a third image from the first image and second image. Also disclosed are an apparatus and program product which perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
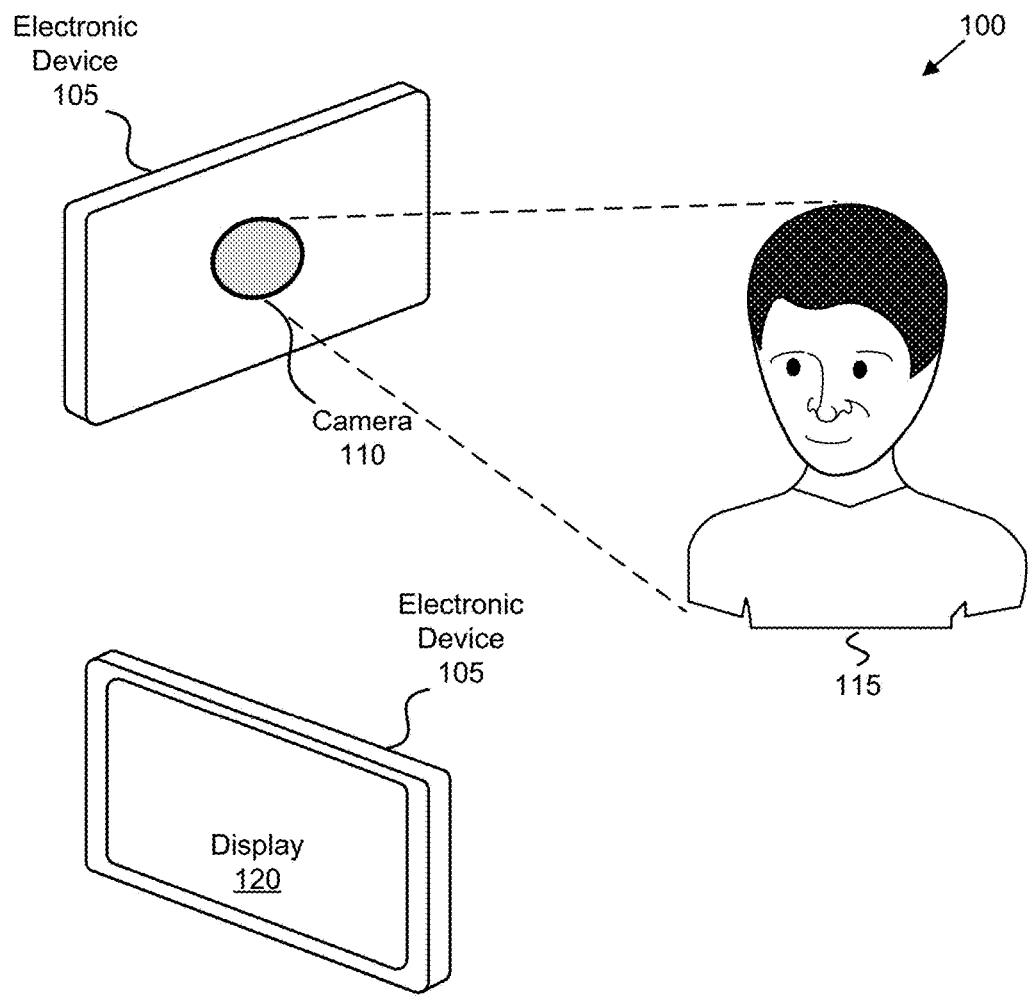
FIG. 1 is a drawing illustrating one embodiment of a system for creating a single image from two images taken at different exposure setting when a face is detected.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The disclosed embodiments provide systems, apparatuses, methods, and program products for selectively combining images taken at different exposure setting when a face is detected. Two frames are captured at independently computed exposure levels: one image at an optimal exposure level for capturing the background and another at an optimal exposure level for capturing the face. The properly exposed face from the foreground is then stitched (e.g., composited) into the background image and the result is blended to minimize the transition.

An apparatus for creating a single image from two images taken at different exposure setting when a face is detected includes an image sensor that captures image data of a photographic subject matter, a processor, and a memory. The memory stores code executable by the processor. The processor calculates a first exposure value for the photographic subject matter. Here, the first exposure value is calculated using the photographic subject matter as a whole. In one embodiment, the first exposure value is calculated to correctly expose the background.

The processor determines whether a face is present within the photographic subject matter. In response to the determining that a face is present within the photographic subject matter, the processor calculates a second exposure value. Here, the second exposure value is calculated to correctly expose the face. The processor controls the image sensor to capture a first image using the first exposure value and to capture a second image using the second exposure value. The processor then creates a third image using the first image and the second image.

In some embodiments, creating the third image using the first image and the second image includes the processor identifying a face region within the second image and compositing the face region into the first image to form the third image. In further embodiments, the processor computes facial feature points in the face region and computes facial feature points in a corresponding region in the first image. Here, the corresponding region includes the face. The processor transforms the face region based on the computed facial feature points. In certain embodiments, transforming the face region based on the computed facial feature points includes the processor generating a transformation matrix using the facial feature points in the face region and the facial feature points in the corresponding region. The processor then composites the face region into the first image to form the third image in response to transforming the face region.

In certain embodiments, the processor calculates a reprojection error from the face region in the second image and the corresponding region in the first image (recall that the corresponding region includes the face). In one embodiment, the processor transforms the face region using a transformation matrix prior to calculating the reprojection error. The processor further compares the reprojection error to a threshold error amount. When creating the third image from the first image and the second image, the processor merges the first image and second image to form the third image in response to the reprojection error being less than the threshold error amount. Otherwise, the processor discards the first image and saving the second image as the third image in response to the being greater than or equal to the threshold error amount. Merging the first image and second image to form the third image may include the processor replacing the corresponding region in the first image with the transformed face region and then blending the transformed face region with the rest of the first image.

In some embodiments, the processor further determines whether a background region of the second image is overblown. In response to the background region of the second image being overblown, the processor merges the first image and second image to form the third image. Otherwise, the processor discards the first image and saving the second image as the third image in response to the background region of the second image not being overblown. Here, merging the first image and second image to form the third image includes the processor compositing only a face region of the first image and second image to form the third image. The processor may further blend the face region with the rest of the third image.

In certain embodiments, the processor determines whether the apparatus moves more than a threshold amount in a time between the capture of the first image and the capture of the second image. In response to the apparatus not moving more than the threshold amount, the processor merges the first image and second image to form the third image. Otherwise, the processor discards the first image and saves the second image as the third image in response to the apparatus moving more than the threshold amount. Here, merging the first image and second image to form the third image includes the processor compositing only a face region of the first image and second image to form the third image. The processor may further blend the face region with the rest of the third image.

A method for creating a single image from two images taken at different exposure setting when a face is detected includes calculating (e.g., by use of a processor) a first exposure level for a photographic subject matter and determining whether a face is present within the photographic subject matter. The method includes calculating a second exposure level in response to determining that a face is present within the photographic subject matter. In one embodiment, the first exposure level is calculated to correctly expose the background and the second exposure level is calculated to correctly expose the face. The method includes capturing a first image using the first exposure level and capturing a second image using the second exposure level. The method further includes selectively combining the first image and second image to form a third image.

In some embodiments, selectively combining the first image and second image includes identifying a face region within the second image and identifying a corresponding region in the first image. Here, the corresponding region includes the face. Selectively combining the first image and second image further includes transforming the face region using a transformation matrix based on the face region and the corresponding region and compositing the transformed face region with the corresponding region in the first image.

In certain embodiments, transforming the face region using a transformation matrix includes computing facial feature points in the face region, computing corresponding facial feature points in the corresponding region, and generating the transformation matrix using the facial feature points and the corresponding facial feature points. The method may further include blending the transformed face region with the rest of the first image.

In certain embodiments, the method includes calculating a reprojection error from a face region in the second image and a corresponding region in the first image, the corresponding region including the face and comparing the reprojection error to a threshold error amount. In response to the reprojection error being less than the threshold error amount, selectively combining the first image and second image includes compositing the first image and second image to form the third image. In one embodiment, compositing the first image and second image includes compositing only the face region into the first image and blending the pixels surrounding the face region. Otherwise, the method discards the first image and saves the second image as the third image, in response to the being greater than or equal to the threshold error amount.

In some embodiments, the method includes determining whether a background region of the second image is overblown. In response to the background region of the second image being overblown, selectively combining the first image and second image to form a third image includes merging a face region of the first image and second image to form the third image. Otherwise, the method discards the first image and saves the second image as the third image in response to the background region of the second image not being overblown. Here, merging the face region may include compositing only the face region and blending the third image.

In certain embodiments, the method includes determining whether the apparatus moves more than a threshold amount in a time between the capture of the first image and the capture of the second image. In response to the apparatus not moving more than the threshold amount, selectively combining the first image and second image to form a third image includes merging a face region of the first image and second image to form the third image. Otherwise, the method discards the second image and saves the first image as the third image in response to the apparatus moving more than the threshold amount. Merging the face region may include compositing only the face region and blending the third image.

The program product for creating a single image from two images taken at different exposure setting when a face is detected includes a computer readable storage medium that stores code executable by a processor. Here, the executable code includes code to calculate a first exposure value for a photographic subject matter, determine whether a face is present within the photographic subject matter, calculate a second exposure value in response to determining that a face is present within the photographic subject matter, capture a first image using the first exposure value, capture a second image using the second exposure value, the second exposure value calculated to expose the face, and create a third image from the first image and second image.

In one embodiment, creating a third image from the first image and the second image includes determining whether a background region of the second image is overblown and compositing a face region of the second image into the first image to form the third image, in response to the background region of the second image being overblown. In another embodiment, creating a third image from the first image and the second image includes determining whether the apparatus moves more than a threshold amount in a time between the capture of the first image and the capture of the second image and compositing a face region of the second image into the first image to form the third image, in response to the apparatus not moving more than the threshold amount.

FIG. 1 is a schematic block diagram illustrating one embodiment of a system 100 for creating a single image from two images taken at different exposure setting when a face is detected, according to embodiments of the disclosure. In the depicted embodiment, the system 100 includes an electronic device 105 having a digital camera 110. The electronic device 105 used to photograph (e.g., capture digital images) of the photographic subject matter 115, depicted here as a person. As used herein, the term "photographic subject matter" refers to the scene, objects, persons, scenery, landscape, or other content to be photographed. In certain embodiments, the electronic device 105 may include a display 120 used as a viewfinder so that a user of the electronic device 105 can see the image data captured by the digital camera 110.

Examples of electronic devices 105 include, but are not limited to, a mobile telephone, a tablet computer, laptop computer, a camera, a portable gaming system, a portable entertainment system, or other device having multiple cameras. The electronic device 105 captures image data of the photographic subject matter 115. Additionally, the electronic device 105 may include additional cameras, such as a front-facing camera located on the same surface as the display 120 (not shown).

The electronic device 105 determines an exposure level for the capturing images. For example, the digital camera 110 may include an exposure meter to measure the light intensity. Here, the electronic device 105 employs an automatic exposure calculation algorithm that selects a first exposure level based on the photographic subject matter 115 as a whole (e.g., based on the total light intensity passing through the lens).

In certain embodiments, the first exposure level may be calculated using center-weighted metering. Here, light levels at the center of the image are given greater weight than light level at the corners. An exposure level calculated using center-weighted metering is referred to herein as a center-weighted exposure level. Other techniques for calculating an overall exposure level may also be used.

However, where the photographic subject matter 115 includes a bright background, an individual in the foreground may be underexposed (e.g., the image data representative of the individual lacks detail because not enough reflected light is captured at the exposure level). Yet, if the digital camera 110 adjusts the exposure level to correctly expose the individual (e.g., the individual's face), then the bright background may become overexposed, and likewise losing detail.

To solve this, the electronic device 105 searches for faces within photographic subject matter 115. Here, the electronic device 105 analyses preview image data using a face detection algorithm. In certain embodiments, the electronic device 105 may include an image processor or dedicated circuitry that operates on image data captured by the digital camera 110 to determine whether a face is present within the photographic subject matter 115.

In response to detecting a face, the electronic device 105 calculates a second exposure level that exposes the detected face. Here, the electronic device 105 may use spot metering to measure light intensity of a region of the image data corresponding to the detected face. In certain embodiments, the electronic device 105 uses the face detection algorithm to identify a region of interest ("ROI") that encompasses the detected face. The electronic device 105 then calculates the second exposure level using the ROI.

In one embodiment, the ROI closely follows the shape of the detected face (or the shape of the head). For example, edge detection, color matching, and other techniques may be used to closely follows the shape of the detected face/head. In another embodiment, the ROI is a predetermined shape that encompasses detected facial features. Here, the size of the ROI may be selected based on the spacing of the detected facial features (e.g., to roughly match the size of the face).

The latter approach may reduce computational complexity (thus increasing processing speed) at the expense of accurately identifying the face region. As exposure level calculated from the face region is also referred to herein as a face-weighted exposure level.

The electronic device 105 captures two images: a first image captured using the first exposure level and a second image captured using the second exposure level. In certain embodiments, the electronic device 105 captures the first image (at the first exposure level) after detecting the face, but prior to calculating the second exposure level. Here, the electronic device 105 captures the second image in response to calculating the second exposure level. However, the delay between capturing the two images allows for some error due to movement of the electronic device 105 (e.g., due to large motions or vibrations) and/or movement of the photographic subject matter 115.

To minimize the delay between capturing the images, in certain embodiments the electronic device 105 calculates the second exposure level before capturing the first and second images. As calculating the second exposure level may involve adjusting settings of the digital camera 110 related to image exposure (e.g., aperture settings, shutter speed, ISO, etc.), in one embodiment the electronic device 105 captures the image the second exposure level (referred to herein as the "second" image) before capturing the image at the first exposure level (referred to herein as the "first" image) in order to minimize the time delay between capture of the first image and capture of the second image.

In order to include detail of both the bright background and the detected face, the electronic device 105 creates a third image from the first and second images. Here, the electronic device 105 merges a face region in the second image (e.g., captured at the second exposure level that correctly exposes the face) with the non-face regions of the first image, for example using compositing and blending techniques, as described below.

Figure 2:
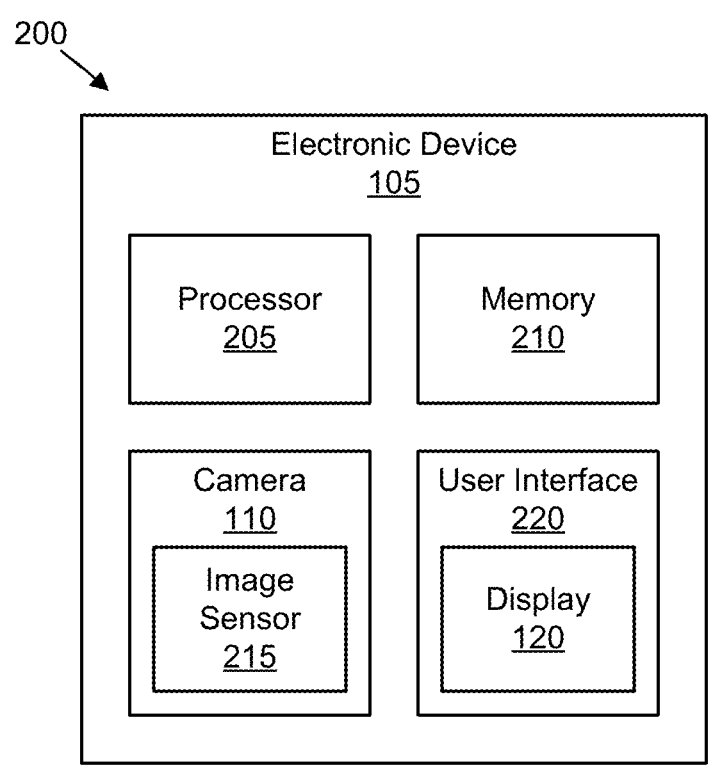
FIG. 2 is a schematic block diagram illustrating one embodiment of an apparatus for creating a single image from two images taken at different exposure setting when a face is detected.

FIG. 2 is a schematic block diagram of an apparatus 200 for creating a single image from two images taken at different exposure setting when a face is detected, according to embodiments of the disclosure. The apparatus 200 may be one embodiment of the electronic device 105 discussed above with reference to FIG. 1. In addition, the electronic device 105 includes a processor 205, a memory 210, a digital camera 110, and a user interface 220. The digital camera 110 includes an image sensor 215, while the user interface 220 may include one embodiment of the display 120 discussed above.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In certain embodiments, the processor 205 is a processor coupled to the image sensor 215. In some embodiments, the processor 205 executes instructions stored in the memory 210 to perform the methods and routines described herein. The processor 205 is communicatively coupled to the memory 210, the digital camera 110, and the user interface 220.

The processor 205 controls the digital camera 110 to capture image data of the photographic subject matter 115. The processor 205 calculates a first exposure value for the photographic subject matter 115. As discussed above, the first exposure value may be calculated using the photographic subject matter 115 as a whole. In one embodiment, the first exposure value is calculated to correctly expose the background.

As used herein, "correctly exposing" a region of the image refers to achieving a balanced exposure that minimizes the number of over- and underexposed pixels in the frame. As understood in the art, an overexposed region is one that is too light/bright such that detail within the region becomes lost, while an underexposed region is one that is too dark, such that detail within the region becomes lost. When determining whether the face region is properly exposed, only the pixels within the face region are considered (e.g., all other pixels in the image are ignored).

The processor 205 determines whether a face is present within the photographic subject matter 115. In response to the determining that a face is present within the photographic subject matter 115, the processor 205 calculates a second exposure value. Here, the second exposure value is calculated to correctly expose the face. The processor 205 controls the digital camera 110 to capture a first image using the first exposure value and to capture a second image using the second exposure value. The processor 205 then creates a third image using the first image and the second image.

In some embodiments, creating the third image using the first image and the second image includes the processor 205 identifying a face region within the second image and compositing the face region into the first image to form the third image. In further embodiments, the processor 205 computes facial feature points in the face region and computes facial feature points in a corresponding region in the first image. Here, the corresponding region includes the face.

The processor 205 transforms the face region based on the computed facial feature points. Transforming the face region is discussed below with reference to FIG. 5. In certain embodiments, transforming the face region based on the computed facial feature points includes the processor 205 generating a transformation matrix using the facial feature points in the face region and the facial feature points in the corresponding region and transforming (e.g., re-projecting) the face region using the transformation matrix. The processor 205 then merges the face region into the first image to form the third image (e.g., using a compositing technique) in response to transforming the face region. Merging the face region into the first image to form the third image may include the processor 205 replacing the corresponding region in the first image with the transformed face region and then blending the transformed face region with the rest of the first image.

As discussed herein, the processor 205 may selectively combine the first image and second image. For example, if a reprojection error from transforming the face region exceeds a threshold amount, then the processor 205 will discard the second image. As another example, if the electronic device 105 moves more than a threshold amount (e.g., as measured using a gyroscope, accelerometer, etc.) in a time between the capture of the first image and the capture of the second image, then the processor 205 discards the second image as the reprojection error, if calculated, would exceed the threshold. In yet another example, if a background region of the second image is not overblown, then there is no need for the first image, so only the second image is kept. These triggers are discussed below with reference to FIG. 4

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to creating a single image from two images taken at different exposure setting when a face is detected, such as face information, exposure settings, and the like. In some embodiments, the memory 210 also stores program code and related data, such as an operating system or other controller algorithms operating on the electronic device 105.

The digital camera 110 includes an image sensor 215 and is used to capture image data. As used herein, image data may include frames in RGB, YUV, YCbCr, or other suitable colorspace, or frame subsets corresponding to a region surrounding the position of each face. The image data may include raw data captured by the image sensor 215 and/or data processed by an image signal processor ("ISP"), or other suitable digital signal processor ("DSP"), in the digital camera 110. In certain embodiments, the processor 205 may be used to process the raw image data. The digital camera 110 may include any number of lenses, image sensors, shutters, and the like.

In certain embodiments, the digital camera 110 includes one or more processors (e.g., image processors) for performing image processing, such as automatic exposure calculation, color processing, brightness/contrast processing, noise reduction, image stabilization, image sharpening, HDR processing, and the like. In one embodiment, the processors of the digital camera 110 may be controlled by, but independent of, the processor 205. In certain embodiments, the digital camera 110 is configured to automatically calculate an optimal exposure settings for the photographic subject matter 115, as a whole. The digital camera 110 may additionally automatically calculate new exposure settings after detecting a face so as to optimize exposure of the detected face (e.g., achieve a balance that minimizes the number of over- and under-exposed pixels in the region corresponding to the detected face).

The user interface 220, in one embodiment, includes the display 120 which may be used as a viewfinder. The user interface 220 may also include any known computer input device including a touch panel, a button, a keyboard, a stylus, a microphone, or the like. For example, the user interface 220 may include a shutter button, a camera mode selector, a menu navigation device, and the like. In some embodiments, the user interface 220 may include a touchscreen or similar touch-sensitive display. In such embodiments, a user may navigate menus, select camera modes, trigger the camera shutter, adjust camera settings, and the like using the touchscreen user interface 220. In some embodiments, the user interface 220 includes two or more different input devices, such as a touch panel and a button, dial, selector, etc.

In certain embodiments, the user interface 220 is capable of outputting audible and/or haptic signals. For example, the user interface 220 may include one or more speakers for producing an audible alert or notification (e.g., a beep or chime) or other sound. In some embodiments, the user interface 220 includes one or more haptic devices for producing vibrations, motion, or other haptic feedback. In some embodiments, all or portions of the user interface 220 may be integrated with the display 120. For example, the user interface 220 and display 120 may form a touchscreen or similar touch-sensitive display. In other embodiments, the user interface 220 comprise additional hardware devices located near the display 120.

Figure 3A:
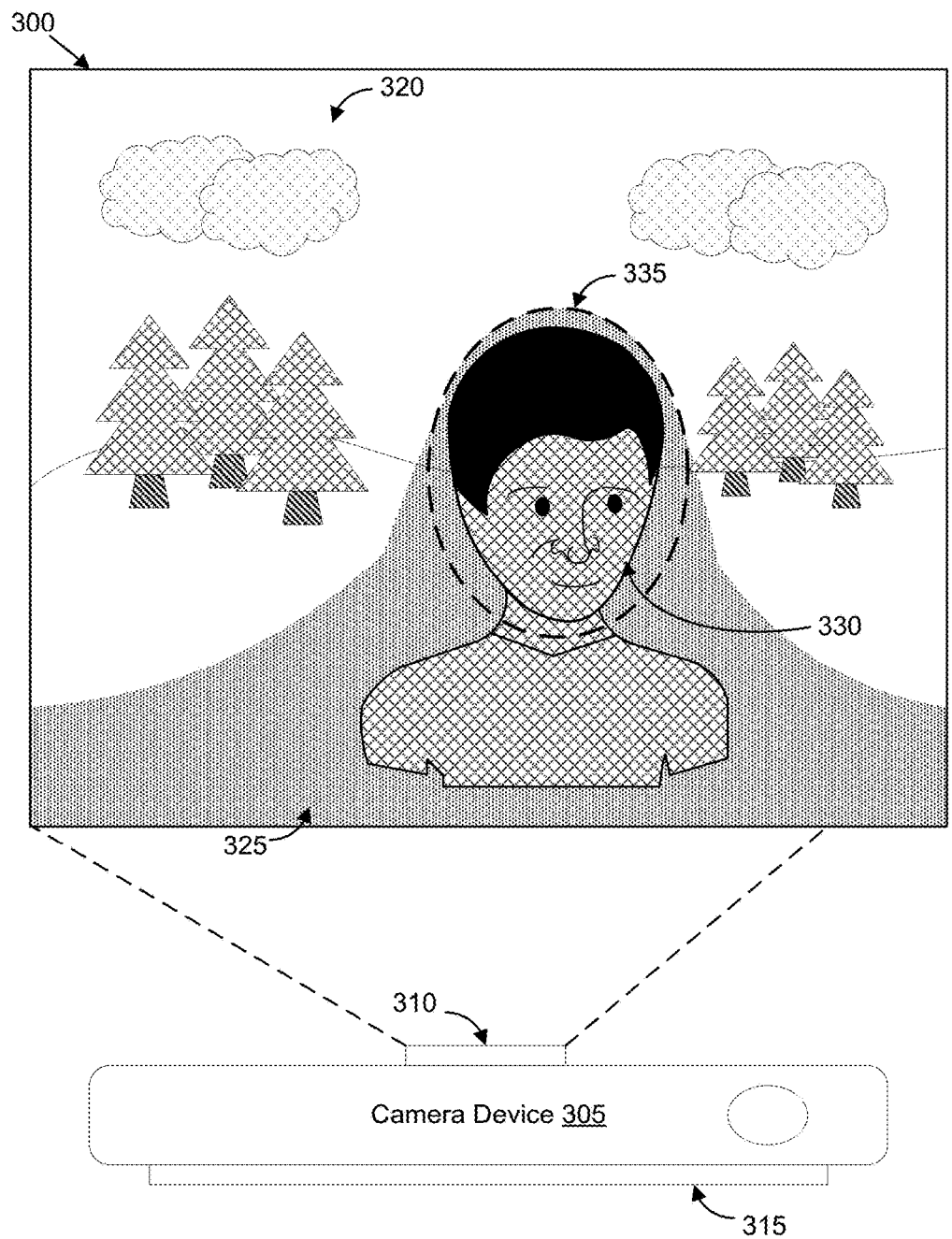
FIG. 3A is a diagram illustrating one embodiment of a backlit image.

FIG. 3A depicts a backlit image 300, according to embodiments of the disclosure. The backlit image 300 is captured by a camera device 305. The camera device 305 may be one embodiment of the electronic device 105 described above with reference to FIGS. 1-2. The camera device 305 includes a camera 310 and a viewfinder 315. The camera 310 may be one embodiment of the digital camera 110 and the viewfinder 315 may be one embodiment of the display 120, described above with reference to FIGS. 1-2.

The backlit image 300 includes a bright background 320. Due to the bright background 320, the backlit image 300 includes a dim foreground 325. Within the dim foreground 325 may be at least one face 330 corresponding to an individual in the foreground. The bright background 320 causes the camera 310 to calculate initial exposure settings (e.g., the first exposure level) that results in the dim foreground 325 and the face 330 being underexposed.

While previewing image data corresponding to the backlit image 300, the camera device 305 searches for faces. Upon detecting the face 330, the camera device 305 identifies a face region 335 encompassing the detected face 330. While depicted as an oval area surrounding the face, the face region 335 may closely follow the face or head of the individual being photographed. The camera device 305 captures the backlit image 300 (e.g., a first image) using the initial exposure settings.

Figure 3B:
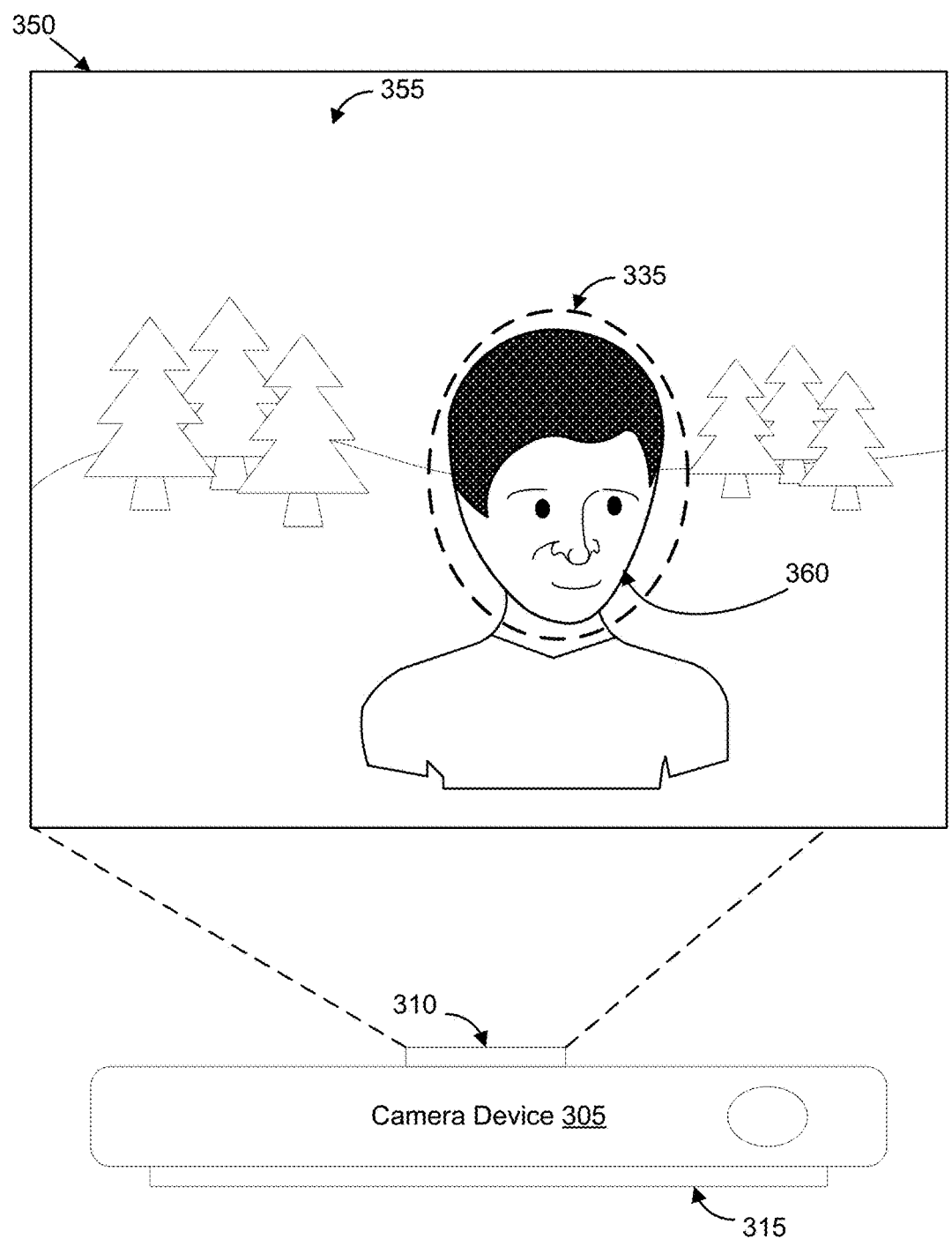
FIG. 3B is a diagram illustrating one embodiment of a face-weighted image.

FIG. 3B depicts a face-weighted image 350 taken of the same subject matter as the backlit image 300. The face-weighted image 350 is captured by the camera device 305. Here, the camera device 305 has adjusted the exposure settings to properly expose the face region 335. The adjusted exposure settings (e.g., corresponding to the second exposure level, discussed above) are also referred to herein as "face weights" or "face-weighted" se. Accordingly, the camera device 305 stores a second capture of the detected face 330 using the face-weighted exposure settings, referred to herein as the "visible" face 360. As a result of the face-weighted exposure settings, the face-weighted image 350 includes an overblown (e.g., overexposed) background 355. Due to the overexposure, the overblown background 355 contains fewer details than the bright background 320. In the depicted example, the overblown background 355 lacks the clouds due to overexposure.

Figure 4:
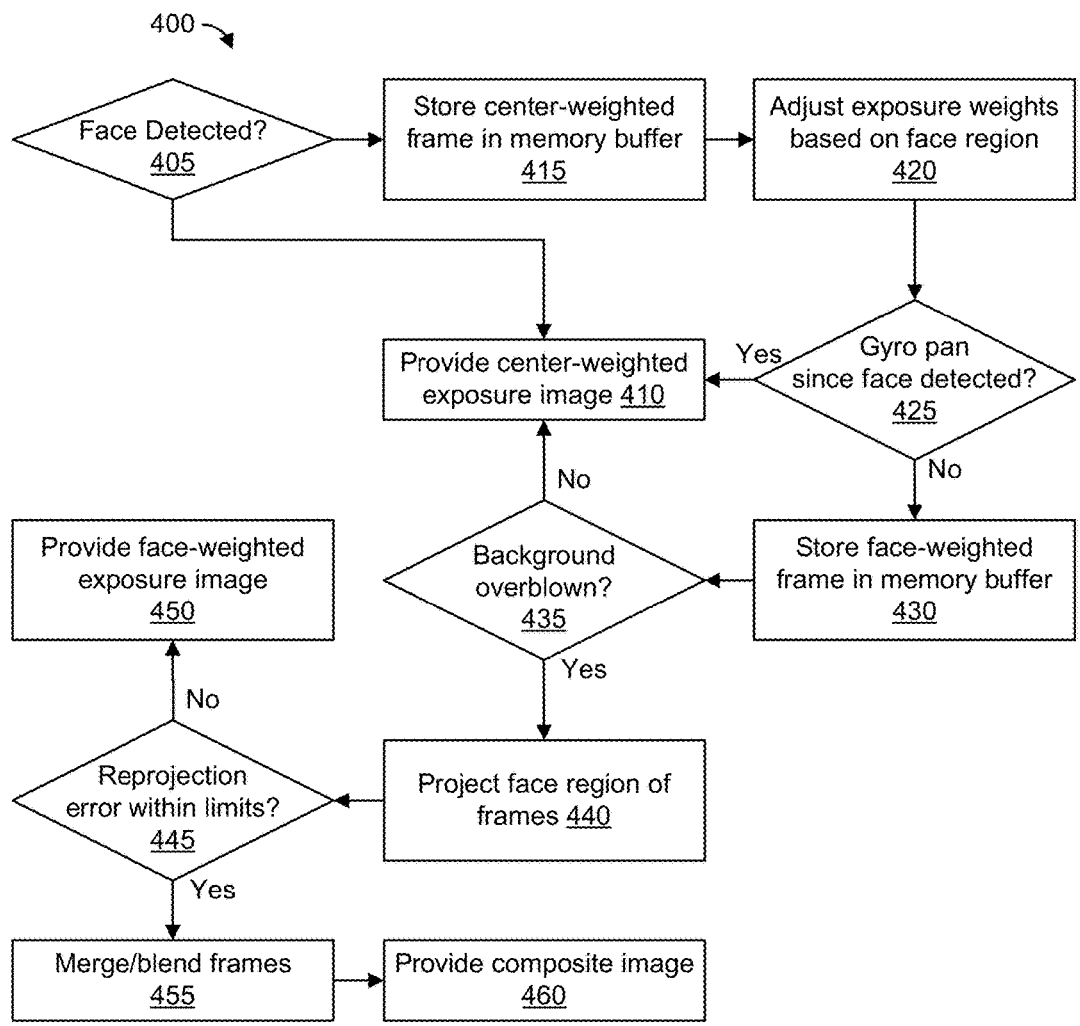
FIG. 4 is a diagram illustrating one embodiment of a procedure for selectively combining images taken at different exposure setting when a face is detected.

FIG. 4 depicts a procedure 400 for a camera (e.g., the electronic device 105 and/or the camera device 305) to create a third image by selectively combining a first image and second image, according to embodiments of the disclosure. The camera begins by determining whether a face is included in a scene to be photographed (block 405). To do so, the camera may use a face detection algorithm to scan preview image data for a face. At this point, the camera is using an initial exposure value (e.g., the first exposure value). In the depicted embodiment, the initial exposure value is calculated using center-weighted metering. In other embodiments, the initial exposure value may be calculated using matrix-weighted metering or other suitable techniques. The initial exposure value may be calculated to minimize the number of over- and underexposed pixels over the entire frame of image data.

If no face is detected, then the camera provides (e.g., captures and stores to memory card or other nonvolatile memory) an image taken using the center-weighted exposure value (block 410). Providing the center-weighted image may also include presenting the captured image on the display 120 or viewfinder 315. Otherwise, if the camera detects a face, then the camera temporarily stores a frame (e.g., the first image discussed above) taken using the center-weighted exposure value in a memory buffer (block 415). The backlit image 300 may be one embodiment of a frame taken using the center-weighted exposure value.

Next, the camera adjusts the exposure weights based on a face region surrounding the detected face (block 420). As described above, the new exposure weights may be calculated using spot-weighted metering of the face region. For example, the new exposure weights may be derived from the initial weights and adjusted based on metering the face regions. In certain embodiments, the new exposure weights minimize the number of over- and underexposed pixels in the face region only, so as to properly expose the detected face.

At this point, the camera determines whether a gyroscope (or other suitable sensor) has detected a pan movement of the camera in the interval since the face was detected (block 425). Alternatively, the relevant interval may be a time since the center-weighted frame was captured. This step allows the camera to avoid unnecessary post-processing, as a reprojection error resulting from the pan movement would render a face-weighted frame incompatible with the center-weighted frame. In certain embodiments, the pan movement is detected when an amount of camera movement exceeds a threshold amount. This movement threshold may be calculated to correspond to the reprojection error threshold, discussed below.

If a pan movement is detected, then the camera provides an image taken using the center-weighted exposure value (block 410) by transferring the center-weighted frame from the buffer into a memory storage, such as a memory card or other nonvolatile memory. The camera may perform image post-processing on the center-weighted frame prior to storing and presenting it. Alternatively, the camera may store the initial exposure settings and attempt to retake the center-weighted frame if a pan movement is detected.

Otherwise, if no pan movement is detected, then the camera temporarily stores a frame (e.g., the second image discussed above) taken using the face-weighted exposure value in the memory buffer (block 430). The face-weighted image 350 may be one embodiment of a frame taken using the face-weighted exposure value. Blocks 405, 415, 420, and 425 comprise a preview phase of the procedure 400.

After capturing the face-weighted frame, the camera determines whether a background of the face-weighted frame is overblown or overexposed (block 435). In certain embodiments, background detection algorithms may be used to identify the background of the face-weighted frame. In one embodiment, a color histogram of the background of the face-weighted frame may be analyzed to determine whether the background is overexposed. In another embodiment, feature matching between the center-weighted and face-weighted frames may be used to determine whether detail is lost in the background of the face-weighted frame due to overexposure. In some embodiments, the center-weighted and face-weighted exposure values are compared to each other and the background is determined to be overblown if a difference in exposure values exceeds a predefined amount.

If the background is overblown, then the camera projects a face region of the center-weighted and face-weighted frames (block 440). Otherwise, if the background is not overblown then the camera provides an image taken using the center-weighted exposure value (block 410), for example by saving the center-weighted frame and discarding the face-weighted frame. Projecting the face region of the center-weighted and face-weighted frames includes calculating a transformation matrix and a reprojection error. Projecting the face region of the frames is discussed in further detail with reference to FIG. 5. In certain embodiments, the camera begins the process of projecting the face region of the center-weighted and face-weighted frames after storing the center-weighted frame. Here, the center-weighted frame may be analyzed (e.g., to identify feature points) concurrently with the camera adjusting the exposure weights based on the face region.

After projecting the face region of the center-weighted and face-weighted frames, the camera determined whether the reprojection error is within a predefined limit (block 445). In certain embodiments, the average reprojection error of a plurality of feature points is compared to a reprojection threshold to determine whether the reprojection error is within the predefined limit. For example, the reprojection error may exceed the threshold when there is excessive movement of the individual being photographed.

Camera movement can also cause the reprojection error to exceed the threshold. As discussed above, excessive reprojection error due to camera movement may be assumed if the gyroscope or other sensor detects a pan movement of the camera (refer to block 425). When the reprojection error exceeds acceptable limits, a transformation of the face region will introduce artifacts and/or be noticeably distorted. As a non-limiting example, a reprojection error less than 25 pixels may be deemed tolerable.

If the reprojection error is within acceptable limits, the camera proceeds to merge the center-weighted and face-weighted frames (block 455). In some embodiments, the camera merges the two frames by stitching a face region of the face-weighted frame onto the center-weighted frame, for example using alpha compositing techniques, and blending the resulting image, for example using alpha blending techniques. Here, the stitched-in face region is blended with the rest of the image to smooth transitions and minimize image artifacts. The resulting image extends the dynamic range for the entire scene captured and retains details in both the background and in the face region due to proper exposure of these regions.

After generating a composite image from the center-weighted and face-weighted frames, the camera provides the composite image (block 460) by storing the composite image to the memory card or other nonvolatile memory. In certain embodiments, providing the composite image may also include presenting the composite image on the display 120 or viewfinder 315. Note that if the reprojection error exceeds acceptable limits, then the camera discards the center-weighted frame and provides an image using the face-weighted exposure value (block 450), e.g., by transferring the face-weighted frame into a memory storage. Blocks 435, 440, 445, and 455 comprise a post-processing phase of the procedure 400.

Note that although the procedure 400 shares superficial similarities with high dynamic range ("HDR"), the procedure 400 is clearly distinct from HDR. In HDR, 3 separate images with are captured: one at an initial exposure level, another at an exposure level a predetermined amount above the initial exposure level, and a third at an exposure level a predetermined amount below the initial exposure level. In contrast, the procedure 400 captures 2 images: one at a face-weighted exposure level, and the second at an exposure level independent the face-weights (e.g., at a center-weighted level). In the procedure 400 the exposure levels are dynamically selected based on either the overall image or a face region within the image. In contrast, with HDR the different exposure levels are a predetermined amount (e.g., +2, 0, −2) from the center-weighted level.

Additionally, the procedure 400 merges only a portion of the image data (e.g., only composites the face region). Further, the procedure 400 provides a merged (composite) image only when a face is detected, when the background is overblown, and when artifacts are tolerable. Accordingly, the procedure 400 is more efficient than HDR as it operates on fewer frames and operates only on select regions with the frames. Further, the procedure 400 produces different results (e.g., a composite image with both background and face correctly exposed) than HDR.

Figure 5:
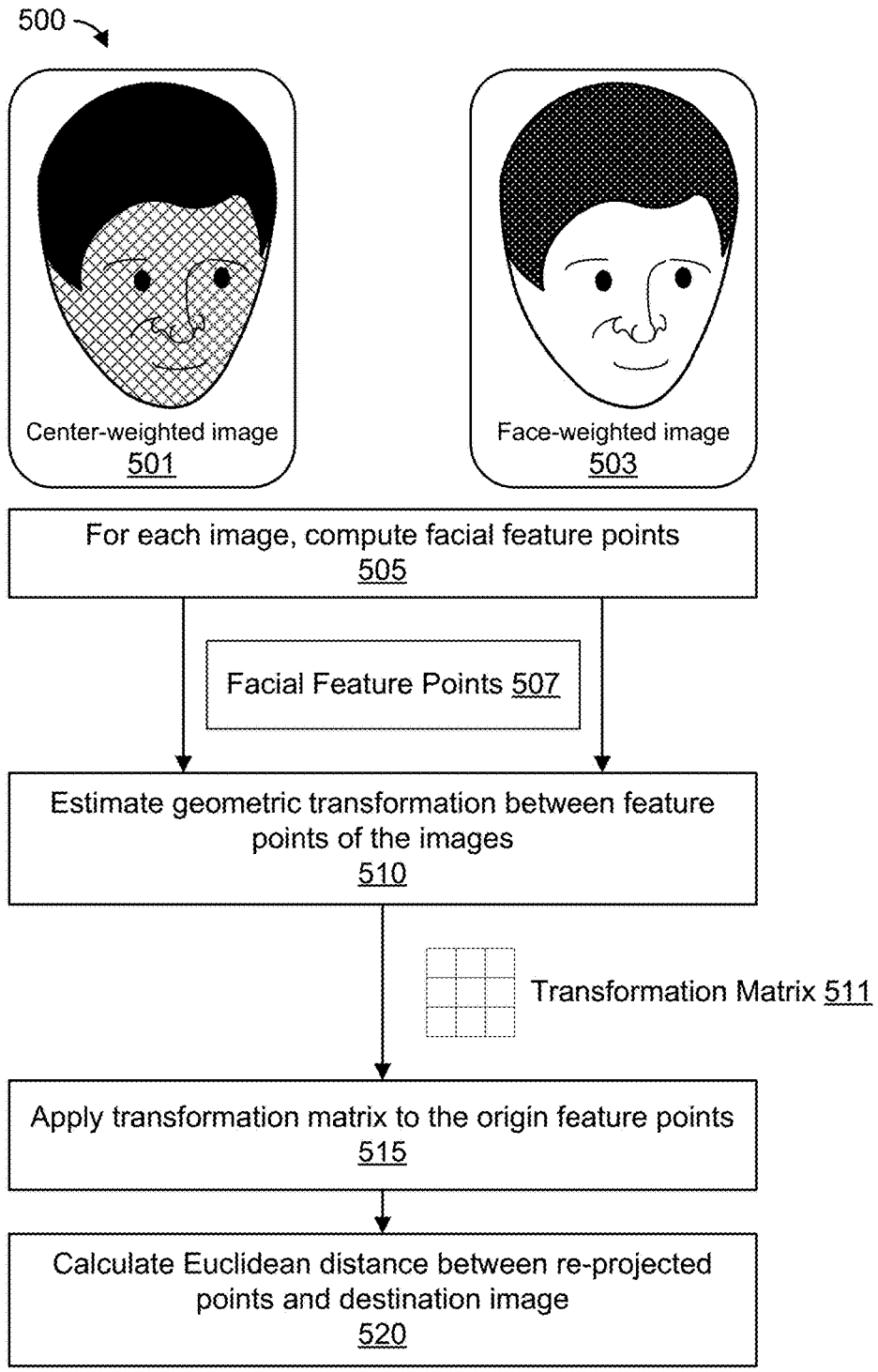
FIG. 5 is a diagram illustrating one embodiment of a procedure for projecting a face region and calculating a reprojection error.

FIG. 5 depicts a procedure 500 for projecting a face region and calculating reprojection error, according to embodiments of the disclosure. The procedure 500 may be performed by a camera, such as the electronic device 105, the camera device 305, and/or the camera described with reference to FIG. 4. In certain embodiments, the procedure 500 corresponds to block 440 in FIG. 4.

FIG. 5 depicts a face region from a center-weighted frame and a corresponding face region from a face-weighted frame, referred to as the center-weighted image 501 and the face-weighted image 503, respectively. Here, the center-weighted image 501 and face-weighted image 503 may correspond to the face regions 335 of the backlit image 300 and face-weighted image 350.

Initially, the camera 310 computes facial feature points 507 for each of the images 501, 503 (see block 505). In certain embodiments, the facial feature points 507 are initially identified by a face detection algorithm used to detect whether a face is present in the photographic subject matter. Alternatively, a camera may compute facial feature points 507 for an initially captured image while simultaneously adjusting exposure setting in preparation to capture the next image. In certain embodiments, set of facial feature points is calculated for each image 501, 503.

Having computed the facial feature points 507, the camera estimates a geometric transformation between the sets of facial feature points 507 (see block 510). The geometric transformation accounts for rotation and/or translation of the photographic subject matter relative to the camera. In certain embodiments, the estimated geometric transformation is represented by the transformation matrix 511. In some embodiments, homography techniques are used to estimate the geometric transformation. In such embodiments, the transformation matrix 511 may be a homography matrix.

After estimating the geometric transformation, the camera applies the transformation matrix 511 (derived from the estimated geometric transformation) to the origin feature points (e.g., the set of facial feature points 507 of the center-weighted image 501, see block 515). This projects the center-weighted image 501 onto the plane of the face-weighted image 503.

Next, the reprojection error is determined by calculating the Euclidean distance between the re-projected feature points (e.g., reprojection of the center-weighted image 501) and the destination image (e.g., the face-weighted image 503, see block 520). For example, pixel coordinates of matching features in the reprojection image and destination image may be used to calculate the Euclidean distance (the Euclidean distance denotes the reprojection error of the feature point. Here, the Euclidean distance may be measured in terms of pixels.

Figure 6:
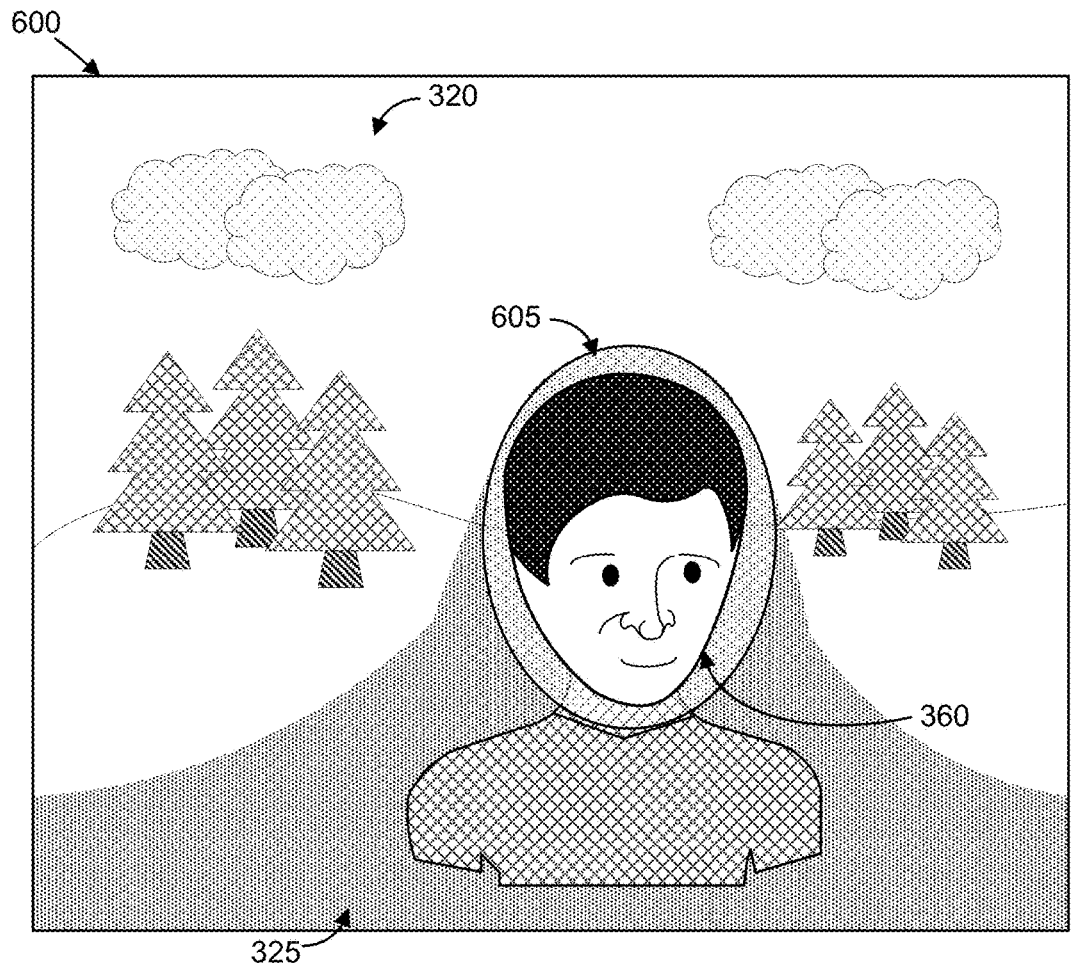
FIG. 6 is a diagram illustrating one embodiment of a composite image.

FIG. 6 depicts a composite image 600, according to embodiments of the disclosure. The composite image 600 corresponds to the result of combining the backlit image 300 and the face-weighted image 350 using the techniques described herein. The composite image 600 is one representation of the composite image generated using the procedure of FIG. 4. The composite image 600 includes the bright background 320, which is not overexposed, and the dim foreground 325. Further, the composite image includes the visible face 360, which is not underexposed. In certain embodiments, the composite image 600 includes a blended region 605 resulting from blending the visible face 360 into the bright background 320 and dim foreground 325. Here, the composite image 600 includes details in the background and face regions and has increased dynamic range compared to both the backlit image 300 and the face-weighted image 350.

Figure 7:
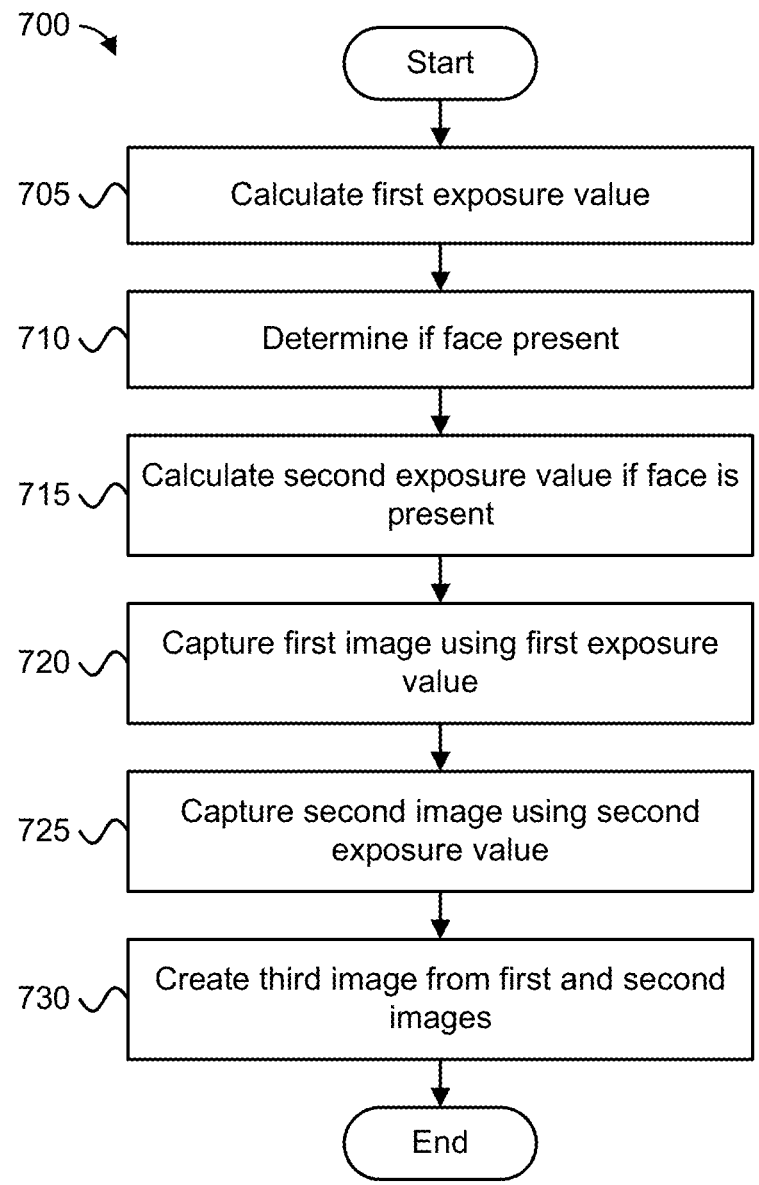
FIG. 7 is a schematic flow chart diagram illustrating one embodiment of method for creating a single image from two images taken at different exposure setting when a face is detected

FIG. 7 illustrates a method 700 for creating a single image from two images taken at different exposure setting when a face is detected, according to embodiments of the disclosure. In some embodiments, the method 700 may be performed by the electronic device 105, the camera device 305, and/or the cameras described above with reference to FIGS. 4 and 5. In addition, the method 700 may be performed by a processor (e.g., the processor 205) and/or other semiconductor hardware embodied in the electronic device 105, the camera device 305, and/or the cameras described above. In another example, the method 700 may be embodied as computer program code stored on computer readable storage media.

The method 700 begins and calculates 705 a first exposure level for a photographic subject matter. In some embodiments, the first exposure value is calculated from the photographic subject matter as a whole (e.g., calculated using all pixels in a frame of image data). In one embodiment, the first exposure level is calculated to correctly expose the background.

The method 700 includes determining 710 whether a face is present within the photographic subject matter. The method 700 includes calculating 715 a second exposure level in response to determining that a face is present within the photographic subject matter. In certain embodiments, the second exposure level is calculated to correctly expose the face.

The method 700 includes capturing 720 a first image using the first exposure level and capturing 725 a second image using the second exposure level. In certain embodiments, the second image is captured at an earlier point in time than the first image. The method 700 further includes creating 730 a third image from the first image and second image.

In some embodiments, creating 730 the third image includes identifying a face region within the second image and identifying a corresponding region in the first image. Here, the corresponding region includes the face. Creating 730 the third image further includes transforming the face region using a transformation matrix, compositing the transformed face region into the first image, and blending the transformed face region with the rest of the first image.

Figure 8:
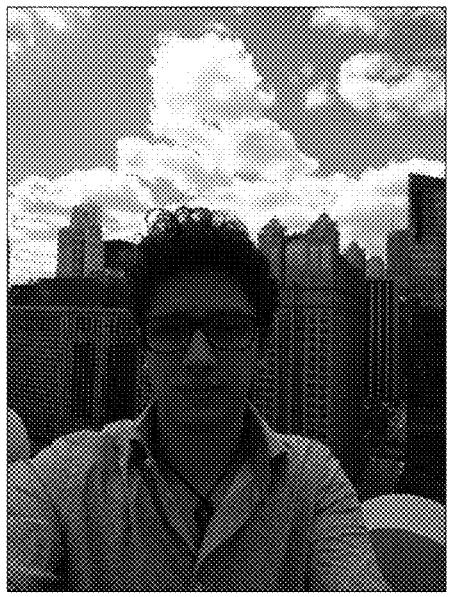
FIG. 8 is a first example of creating a single image from two images taken at different exposure setting when a face is detected.
Figure 8:
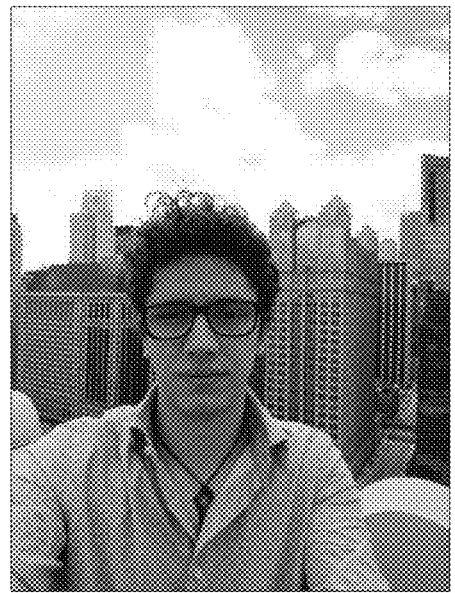
Figure 8:
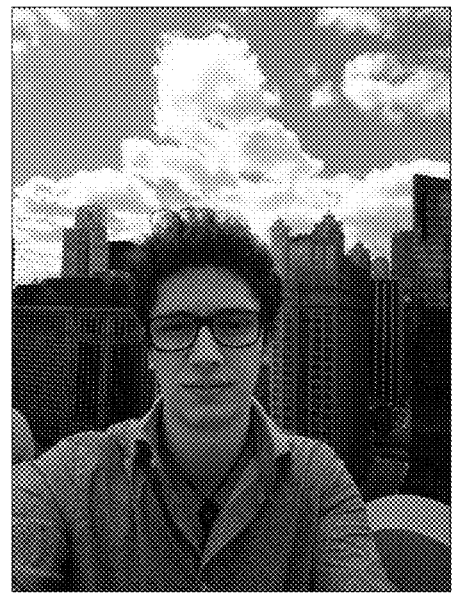

FIG. 8 depicts a first example 800 of creating a single image from two images taken at different exposure setting when a face is detected, according to embodiments of the disclosure. The first example 800 includes a center-weighted image 805 (e.g., a first image) captured using an initial exposure value (e.g., calculated using center-weighted metering). Note that contrast (e.g., shadows) and other details in the clouds are visible in the center-weighted image 805, however the face lacks detail due to underexposure.

The first example 800 also includes a face-weighted image 810 (e.g., a second image) captured using a second exposure value (e.g., captured using face-weights calculated from spot metering of the face region). Note that details in the face are visible in the face-weighted image 810, however the clouds lack detail due to overexposure. The first example also includes a merged image 815 created by compositing the face region of the face-weighted image 810 into the center-weighted image 805. Note that in the merged image 815, details of both the face and the clouds are visible. Note also that areas around the face (e.g., the neck area) are blended.

Figure 9:
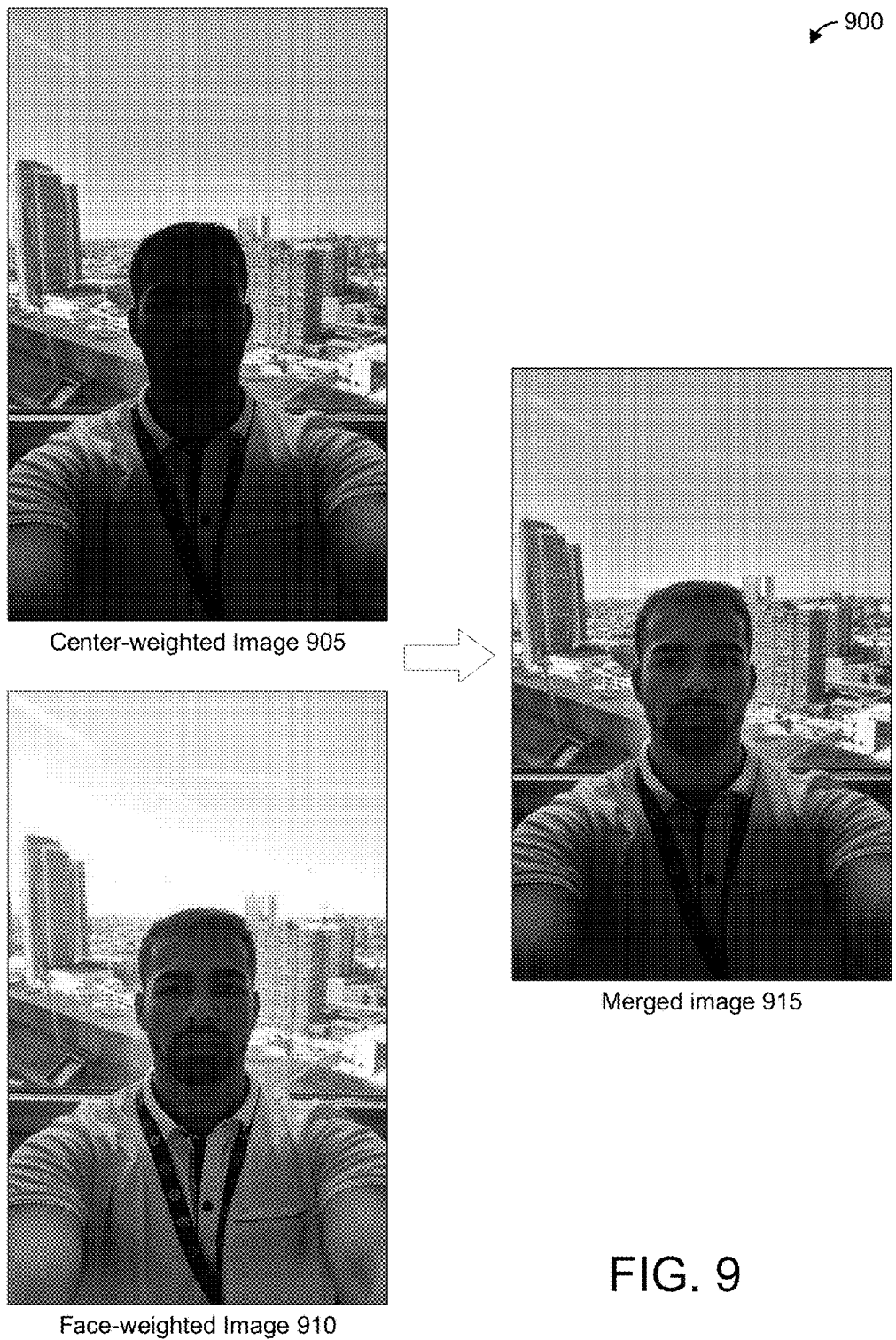
FIG. 9 is a second example of creating a single image from two images taken at different exposure setting when a face is detected.

FIG. 9 depicts a second example 900 of creating a single image from two images taken at different exposure setting when a face is detected, according to embodiments of the disclosure. The second example 900 includes a center-weighted image 905 (e.g., a first image) captured using an initial exposure value (e.g., calculated using center-weighted metering). Note that contrails in the sky and building details are visible in the background of the center-weighted image 905, however the face and foreground lack detail due to underexposure.

The second example 900 also includes a face-weighted image 910 (e.g., a second image) captured using a second exposure value (e.g., captured using face-weights calculated from spot metering of the face region). Note that details in the face are visible in the face-weighted image 910, however the sky and buildings lack detail due to overexposure. The second example 900 also includes a merged image 915 created by compositing the face region of the face-weighted image 910 into the center-weighted image 905. Note that in the merged image 915, details of both the face and the sky/buildings are visible, however other areas of the foreground remain underexposed (compared to the face-weighted image 910). Note also that areas around the face (e.g., the neck and collar areas) are blended.

Figure 10:
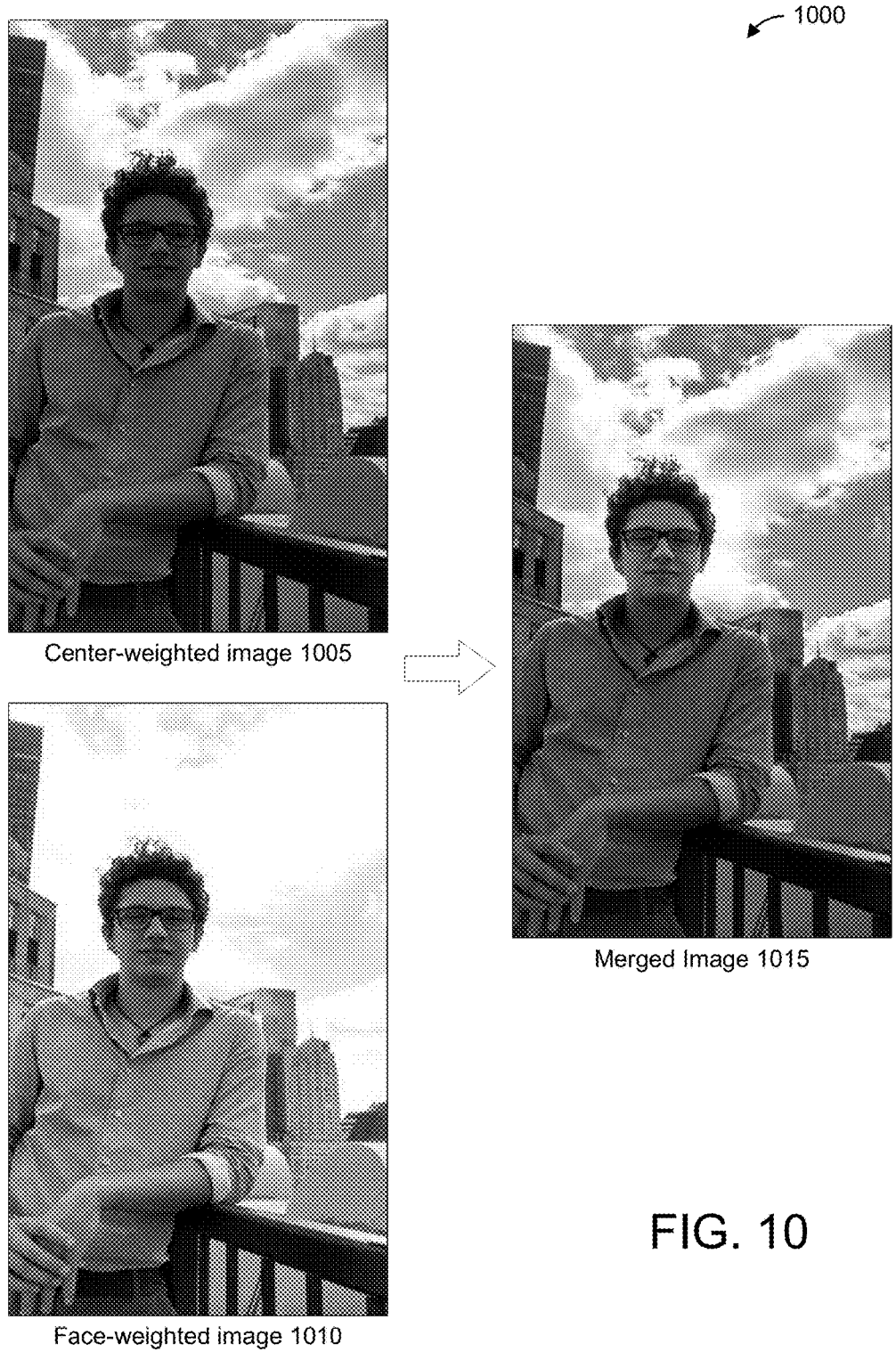
FIG. 10 is a third example of creating a single image from two images taken at different exposure setting when a face is detected.

FIG. 10 depicts a third example 1000 of creating a single image from two images taken at different exposure setting when a face is detected, according to embodiments of the disclosure. The third example 1000 includes a center-weighted image 1005 (e.g., a first image) captured using an initial exposure value (e.g., calculated using center-weighted metering). Note that details in the sky (e.g., clouds) are visible in the background of the center-weighted image 1005, however the face lacks detail due to underexposure.

The third example 1000 also includes a face-weighted image 1010 (e.g., a second image) captured using a second exposure value (e.g., captured using face-weights calculated from spot metering of the face region). Note that details in the face is visible in the face-weighted image 1010, however the sky/clouds lack detail due to overexposure. The third example 1000 also includes a merged image 1015 created by compositing the face region of the face-weighted image 1010 into the center-weighted image 1005. Note that in the merged image 1015, details of both the face and the sky/clouds are visible.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus comprising:
   an image sensor that captures image data of a photographic subject matter;
   a processor; and
   a memory that stores code executable by the processor to:
   calculate a first exposure value for the photographic subject matter, wherein the first exposure value is calculated from the photographic subject matter as a whole;
   determine whether a face is present within the photographic subject matter;
   calculate a second exposure value in response to determining that a face is present within the photographic subject matter, wherein the second exposure value is calculated to expose the face;
   capture a first image using the first exposure value;
   capture a second image using the second exposure value; and
   create a third image from the first image and the second image, wherein creating the third image from the first image and the second image comprises the processor:
   determining whether a background region of the second image is overblown;
   compositing the first image and second image to form the third image in response to the background region of the second image being overblown; and
   discarding the first image and saving the second image as the third image in response to the background region of the second image not being overblown.

2. The apparatus of claim 1, wherein compositing the first image and second image to form the third image comprises the processor:
   identifying a face region within the second image; and
   compositing the face region into the first image to form the third image.

3. The apparatus of claim 2, wherein compositing the first image and second image to form the third image further comprises the processor:
   computing facial feature points in the face region;
   computing facial feature points in a corresponding region in the first image, the corresponding region comprising the face; and
   transforming the face region based on the computed facial feature points, wherein compositing the face region into the first image to form the third image occurs in response to transforming the face region.

4. The apparatus of claim 3, wherein transforming the face region based on the computed facial feature points comprises the processor:
   generating a transformation matrix using the facial feature points in the face region and the facial feature points in the corresponding region.

5. The apparatus of claim 1, wherein the processor further:
   calculates a reprojection error from a face region in the second image and a corresponding region in the first image, the corresponding region comprising the face; and
   compares the reprojection error to a threshold error amount, wherein creating the third image from the first image and the second image further comprises the processor:
   merging the first image and second image to form the third image in response to the reprojection error being less than the threshold error amount; and
   discarding the first image and saving the second image as the third image in response to the being greater than or equal to the threshold error amount.

6. The apparatus of claim 5, wherein merging the first image and second image to form the third image comprises the processor:
   transforming the face region using a transformation matrix;

replacing the corresponding region in the first image with the transformed face region; and blending the transformed face region with the first image.

7. The apparatus of claim 1, wherein compositing the first image and second image to form the third image comprises the processor blending only a face region of the first image and second image.

8. The apparatus of claim 1, wherein the processor further determines whether the apparatus moves more than a threshold amount in a time between the capture of the first image and the capture of the second image, wherein creating the third image from the first image and the second image further comprises the processor:
   merging the first image and second image to form the third image in response to the apparatus not moving more than the threshold amount; and
   discarding the second image and saving the first image as the third image in response to the apparatus moving more than the threshold amount.

9. The apparatus of claim 1, wherein the first exposure value is calculated to correctly expose a background.

10. A method comprising:
    calculating, by use of a processor, a first exposure level for a photographic subject matter;
    determining whether a face is present within the photographic subject matter;
    calculating a second exposure level in response to determining that a face is present within the photographic subject matter;
    capturing a first image using the first exposure level;
    capturing a second image using the second exposure level, the second exposure level calculated to expose the face; and
    creating a third image from the first image and second image, wherein creating the third image from the first image and the second image comprises:
       determining whether a background region of the second image is overblown;
       compositing the first image and second image to form the third image in response to the background region of the second image being overblown; and
       discarding the first image and saving the second image as the third image in response to the background region of the second image not being overblown.

11. The method of claim 10, wherein compositing the first image and second image to form the third image comprises:
    identifying a face region within the second image;
    identifying a corresponding region in the first image, the corresponding region comprising the face;
    transforming the face region using a transformation matrix based on the face region and the corresponding region; and
    blending the corresponding region in the first image with the transformed face region.

12. The method of claim 11, wherein transforming the face region using a transformation matrix comprises:
    computing facial feature points in the face region;
    computing corresponding facial feature points in the corresponding region; and
    generating the transformation matrix using the facial feature points and the corresponding facial feature points,
    wherein the method further comprises blending the transformed face region with the first image.

13. The method of claim 10, further comprising:
    calculating a reprojection error from a face region in the second image and a corresponding region in the first image, the corresponding region comprising the face; and
    comparing the reprojection error to a threshold error amount,
    wherein creating the third image from the first image and the second image further comprises:
       merging the face region into the first image to form the third image in response to the reprojection error being less than the threshold error amount; and
       discarding the first image and saving the second image as the third image in response to the being greater than or equal to the threshold error amount.

14. The method of claim 13, wherein merging the face region into the first image to form the third image comprises blending only the face region with the first image, wherein the first exposure level is calculated to correctly expose a background.

15. The method of claim 10, wherein compositing the first image and second image to form the third image comprises:
    merging only a face region of the first image and second image to form the third image in response to the background region of the second image being overblown.

16. The method of claim 10, wherein creating the third image from the first image and the second image further comprises:
    determining whether a camera device capturing the first image moves more than a threshold amount in a time between the capture of the first image and the capture of the second image;
    merging only a face region of the first image and second image to form the third image in response to the camera device not moving more than the threshold amount; and
    discarding the second image and saving the first image as the third image in response to the camera device moving more than the threshold amount.

17. A program product comprising a non-transitory computer readable storage medium that stores code executable by a processor, the executable code comprising code to perform:
    calculating a first exposure value for a photographic subject matter;
    determining whether a face is present within the photographic subject matter;
    calculating a second exposure value in response to determining that a face is present within the photographic subject matter;
    capturing a first image using the first exposure value;
    capturing a second image using the second exposure value, the second exposure value calculated to expose the face; and
    selectively combining the first image and second image to form a third image, wherein selectively combining the first image and the second image comprises:
       determining whether a background region of the second image is overblown;
       compositing a face region of the second image into the first image to form the third image, in response to the background region of the second image being overblown; and
       discarding the first image and saving the second image as the third image in response to the background region of the second image not being overblown.

18. The program product of claim 17, wherein selectively combining the first image and the second image further comprises:
- determining whether a camera device capturing the first image moves more than a threshold amount in a time between the capture of the first image and the capture of the second image;
- compositing a face region of the second image into the first image to form the third image, in response to the camera device not moving more than the threshold amount; and
- discarding the second image and saving the first image as the third image in response to the camera device moving more than the threshold amount.

* * * * *

UNITED STATES PATENT AND TRADEMARK OFFICE
CERTIFICATE OF CORRECTION

PATENT NO. : 10,158,797 B2  
APPLICATION NO. : 15/476729  
DATED : December 18, 2018  
INVENTOR(S) : Saeid Bahert, Peter Matsimanis and Cesare Mercurio Page 1 of 1

It is certified that error appears in the above-identified patent and that said Letters Patent is hereby corrected as shown below:

On the Title Page

Item [72], delete "Saeid Baghert, Chicago, IL (US);" and insert --Saeid Bagheri, Chicago, IL (US);--

Signed and Sealed this  
Twelfth Day of March, 2019

Andrei Iancu  
*Director of the United States Patent and Trademark Office*